US009534868B1

(12) United States Patent
Perryman et al.

(10) Patent No.: US 9,534,868 B1
(45) Date of Patent: Jan. 3, 2017

(54) AERODYNAMIC CONFORMAL NOSE CONE AND SCANNING MECHANISM

(71) Applicant: Lockheed Martin Corporation, Bethesda, MD (US)

(72) Inventors: Gary Paul Perryman, Arlington, TX (US); Bruno J. Evans, Keller, TX (US); Thomas Hiromoto, Dallas, TX (US); Don A. Larson, Kennedale, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/724,295

(22) Filed: May 28, 2015

Related U.S. Application Data

(60) Provisional application No. 62/007,230, filed on Jun. 3, 2014.

(51) Int. Cl.
| *F41G 7/26* | (2006.01) |
| *F42B 10/46* | (2006.01) |
| *F41G 7/00* | (2006.01) |
| *F42B 10/00* | (2006.01) |

(52) U.S. Cl.
CPC ............... *F41G 7/26* (2013.01); *F42B 10/46* (2013.01)

(58) Field of Classification Search
CPC ........... F42B 10/32; F42B 10/38; F42B 10/42; F42B 10/46; F42B 10/60; F42B 10/62; F42B 10/64; F42B 10/66; F41G 7/20; F41G 7/22; F41G 7/2246; F41G 7/2253; F41G 7/226; F41G 7/2266; F41G 7/228; F41G 7/2293; F41G 7/24; F41G 7/26; F41G 7/2213

USPC .................. 244/3.1–3.19; 343/872, 873
See application file for complete search history.

(56) References Cited

U.S. PATENT DOCUMENTS

| 3,014,353 | A |  | 12/1961 | Scully et al. |
| 3,435,137 | A |  | 3/1969 | Altshuler et al. |
| 3,841,585 | A |  | 10/1974 | Evers-Euterneck |
| 3,912,859 | A |  | 10/1975 | Christopherson |
| 3,954,228 | A |  | 5/1976 | Davis, Jr. |
| 3,993,907 | A |  | 11/1976 | Veron |
| 4,006,356 | A |  | 2/1977 | Johnson et al. |
| 4,093,154 | A |  | 6/1978 | McLean |
| 4,168,813 | A |  | 9/1979 | Pinson et al. |
| 4,245,890 | A | * | 1/1981 | Hartman .................. F42B 10/46 244/3.16 |

(Continued)

FOREIGN PATENT DOCUMENTS

| EP | 0616187 B1 | 8/1997 |
| EP | 0833123 | 4/1998 |

OTHER PUBLICATIONS

Author Unknown, "Module 7: Laser Trackers and Alignment Systems," Jun. 23, 2014, Center for Occupational Research and Development (CORD), http://pe2bz.philpem.me.uk/Lights/-%20Laser/Info-999-LaserCourse/C00-M07-LaserTrackersAndAlignmentSystems/module7.htm, 26 pages.

(Continued)

*Primary Examiner* — Bernarr Gregory
(74) *Attorney, Agent, or Firm* — Withrow + Terranova, PLLC

(57) ABSTRACT

An aerodynamic conformal nose cone and scanning mechanism is disclosed. Laser energy, from within a body of a missile, is directed through a solid, optically transparent nose cone. A detector in the body detects reflected laser energy that passes through the solid, optically transparent nose cone.

21 Claims, 8 Drawing Sheets

(56) References Cited

U.S. PATENT DOCUMENTS

| | | | |
|---|---|---|---|
| 4,436,260 A * | 3/1984 | Donelan | F41G 7/2246 244/3.16 |
| 4,500,051 A * | 2/1985 | Cottle, Jr. | F41G 7/226 244/3.16 |
| 4,678,142 A | 7/1987 | Hirschfeld | |
| 4,917,330 A | 4/1990 | Dulat et al. | |
| 4,949,917 A * | 8/1990 | Cottle, Jr. | F41G 7/226 244/3.16 |
| 5,088,659 A | 2/1992 | Neff et al. | |
| 5,327,149 A | 7/1994 | Kuffer | |
| 5,458,298 A | 10/1995 | Lamelot | |
| 5,669,580 A | 9/1997 | Strauss | |
| 5,693,907 A | 12/1997 | Rudnik | |
| 5,836,540 A | 11/1998 | Romer et al. | |
| 5,973,649 A | 10/1999 | Andressen | |
| 5,999,122 A | 12/1999 | Shoucri et al. | |
| 6,091,905 A | 7/2000 | Yahav et al. | |
| 6,160,910 A | 12/2000 | Freifeld | |
| 6,180,938 B1 | 1/2001 | Crowther et al. | |
| 6,411,331 B1 | 6/2002 | Sansom-Wai et al. | |
| 6,411,445 B1 | 6/2002 | Jackson | |
| 6,462,889 B1 | 10/2002 | Jackson | |
| 6,707,044 B2 | 3/2004 | Lannestedt et al. | |
| 6,959,893 B1 * | 11/2005 | Sadowski | F42B 10/64 244/3.16 |
| 8,130,167 B2 | 3/2012 | Glabe et al. | |
| 8,159,407 B2 | 4/2012 | Dittrich et al. | |
| 8,581,800 B2 | 11/2013 | Suematsu et al. | |
| 9,207,053 B2 | 12/2015 | Ell et al. | |

OTHER PUBLICATIONS

Karthikeyan, T.V., et al., "Guided Missiles," Popular Science & Technology Series, 1990, Defence Scientific Information & Documentation Center, http://www.drdo.gov.in/drdo/data/Guided%20Missiles.pdf, 90 pages.

Non-Final Office Action for U.S. Appl. No. 13/475,562, mailed Apr. 30, 2014, 8 pages.

Notice of Allowance for U.S. Appl. No. 13/475,562, mailed Sep. 24, 2014, 6 pages.

Non-Final Office Action for U.S. Appl. No. 14/463,217, mailed Dec. 18, 2015, 8 pages.

Author Unknown, "In-Line Beam Steerer," Special Optics, Date accessed: Jan. 27, 2016, 2 pages, http://specialoptics.com/products/standard-products/beam-steering-devices/line-beam-steerer/.

Author Unknown, "N1203C Precision Beam Translator," Keysight Technologies, Date Accessed: Jan. 27, 2016, 1 page, http://www.keysight.com/en/pd-156323-pn-N1203C/precision-beam-translator?cc=US&lc=eng.

Li, Yan, et al., "Application of Conformal Optical Design in Star Sensor," International Symposium on Photoelectronic Detection and Imaging 2007: Optoelectronic System Design, Manufacturing, and Testing, Proceedings of SPIE, vol. 5624, 2008, SPIE, 8 pages.

Trotta, Patrick A., "Precision Conformal Optics Technology Program," Window and Dome Technologies and Materials VII, Proceedings of SPIE, vol. 4375, 2001, SPIE, pp. 96-107.

Non-Final Office Action for U.S. Appl. No. 14/463,217, mailed May 23, 2016, 8 pages.

Notice of Allowance for U.S. Appl. No. 14/463,217, mailed Oct. 20, 2016, 7 pages.

* cited by examiner

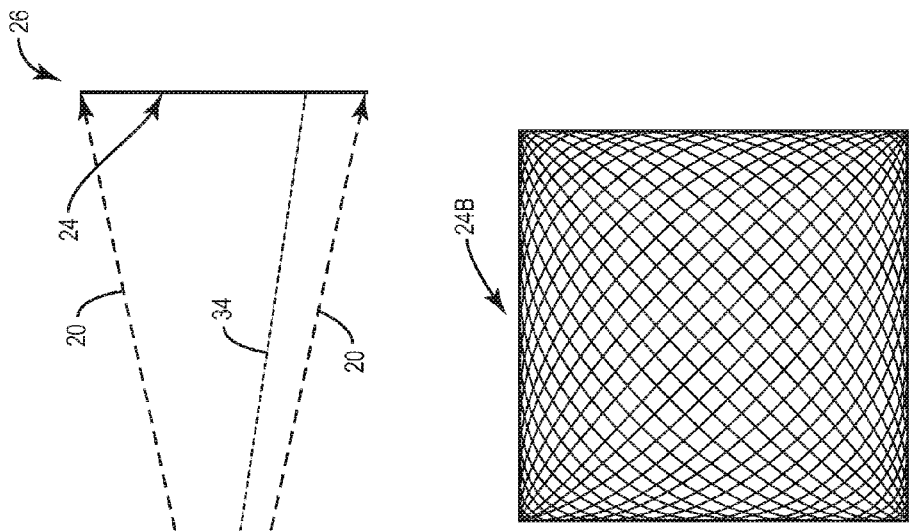
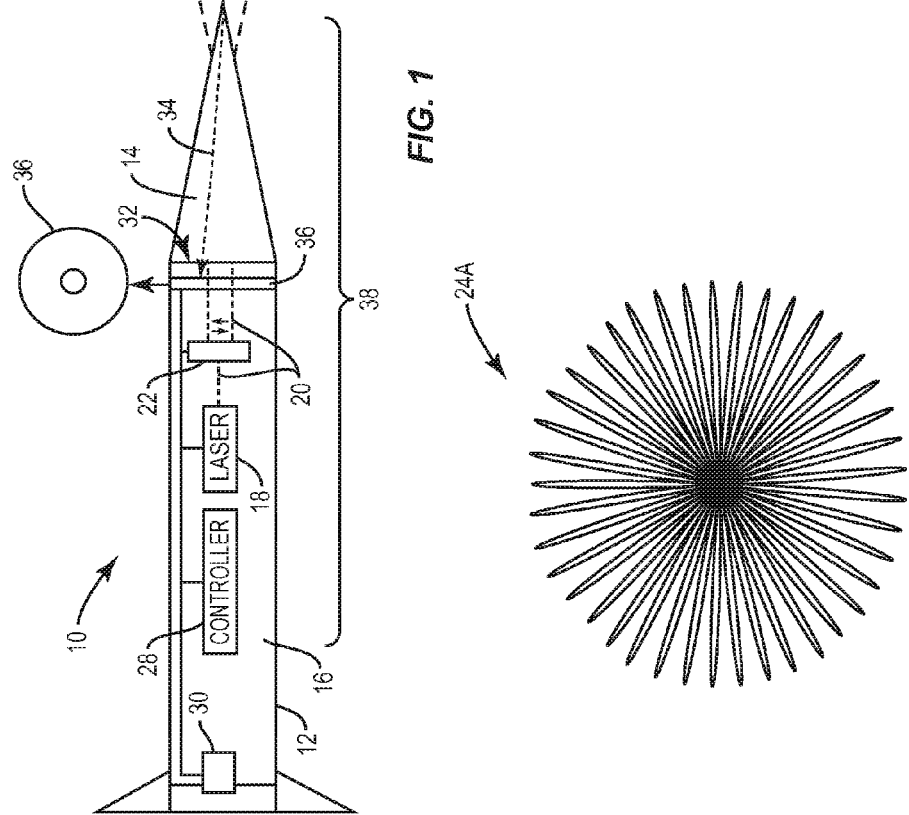

AERODYNAMIC CONFORMAL NOSE CONE AND SCANNING MECHANISM

RELATED APPLICATIONS

This application claims the benefit of provisional patent application Ser. No. 62/007,230, filed Jun. 3, 2014, the disclosure of which is hereby incorporated herein by reference in its entirety.

TECHNICAL FIELD

The embodiments relate to nose cones, and in particular, to a solid aerodynamic nose cone and related scanning mechanism.

BACKGROUND

Aerodynamic conformal nose cones reduce drag compared to non-conformal, dome-shaped nose cones, allowing a missile to fly faster and have greater range. Use of an aerodynamic conformal nose cone compared to a non-conformal, traditional spherical dome-shaped nose cone can increase range 50% or more. However, because a conformal nose cone is aspheric, it induces aberrations in reflected energy received through the conformal nose cone that change with the look angle of the missile. Such aberrations can make it difficult for a laser-designated missile to accurately steer toward a desired location based on reflected energy.

SUMMARY

The embodiments relate to a solid optically transparent nose cone and related scanning mechanism that emits energy, such as laser energy, from inside a body of a missile through the nose cone, and receives reflections of the laser energy through the nose cone. The reflections of the laser energy may be used to guide the missile.

In one embodiment, a method is provided. The method includes directing, from within a body of a missile having a solid, optically transparent nose cone, laser energy through the solid, optically transparent nose cone into a field of regard. The method further includes detecting, by a detector in the body, reflected laser energy that passes through the solid, optically transparent nose cone.

In one embodiment, based on detecting the reflected laser energy, a signal is sent to a missile guidance system of the missile to alter a direction of the missile.

In one embodiment, the detector comprises an annular detector comprising a single detector element.

In one embodiment, the laser energy comprises a laser beam, and directing the laser energy from inside the body of the missile through the solid, optically transparent nose cone further includes directing the laser beam from inside the body of the missile through the solid, optically transparent nose cone to cause the laser beam to generate a scan pattern in a far field of the laser beam.

In one embodiment, directing the laser beam from inside the body of the missile through the solid, optically transparent nose cone to cause the laser beam to generate the scan pattern in the far field of the laser beam includes emitting the laser beam while concurrently translating the laser beam behind the solid, optically transparent nose cone in a translation pattern that causes emission of the laser beam from a front of the solid, optically transparent nose cone to generate the scan pattern in the far field of the laser beam.

In one embodiment, directing the laser beam from inside the body of the missile through the solid, optically transparent nose cone to cause the laser beam to generate the scan pattern in the far field of the laser beam includes emitting the laser beam while concurrently tilting the laser beam in a tilt pattern that causes emission of the laser beam from a front of the solid, optically transparent nose cone to generate the scan pattern in the far field of the laser beam.

In one embodiment, the reflected energy is a reflected laser beam, and the reflected laser beam is detected at a first time, and the method further includes determining a location in the far field of the laser beam at which the laser beam was directed at the first time based on the scan pattern. Based on the location, a signal is sent to a missile guidance system of the missile to direct the missile toward the location.

In another embodiment, a missile is provided. The missile includes a solid, optically transparent nose cone, and a scanning mechanism configured to scan a laser beam through the solid, optically transparent nose cone and form a scan pattern in a far field of the laser beam. The missile also includes a detector configured to detect a reflected laser beam that passes through the solid, optically transparent nose cone.

In one embodiment, the missile further includes a missile guidance system, and a controller configured to signal the missile guidance system to alter a direction of the missile based on the reflected laser beam.

In one embodiment, the controller is further configured to determine a time of a detection of the reflected laser beam, determine a location where the laser beam was directed at the time, and signal the missile guidance system to alter the direction of the missile toward the location.

In one embodiment, the controller is configured to cause the scanning mechanism to scan the laser beam in the scan pattern. To determine the location, the controller is configured to determine the location based on the scan pattern.

In one embodiment, the detector is annular, and forms a transparent opening in a center of the detector. The detector is positioned in a path of the laser beam between the scanning mechanism and the solid, optically transparent nose cone, and the scanning mechanism is configured to scan the laser beam through the transparent opening.

In another embodiment, a missile front-end assembly is provided. The missile front-end assembly includes a solid, optically transparent nose cone, a controller, and a scanning mechanism coupled to the controller. The scanning mechanism is configured to scan, in response to signals from the controller, a laser beam through the solid, optically transparent nose cone to form a scan pattern in a far field of the laser beam. A detector is configured to detect a reflected laser beam that passes through the solid, optically transparent nose cone.

In one embodiment, the detector is annular, and forms a transparent opening in a center of the detector. The detector is positioned in a path of the laser beam between the scanning mechanism and the solid, optically transparent nose cone. The scanning mechanism is configured to scan the laser beam through the transparent opening.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 is a block diagram of a system in which embodiments may be practiced;

FIG. 2 is a diagram illustrating an example scan pattern according to one embodiment;

FIG. 3 is a diagram illustrating an example scan pattern according to another embodiment;

DETAILED DESCRIPTION

Figure 4:
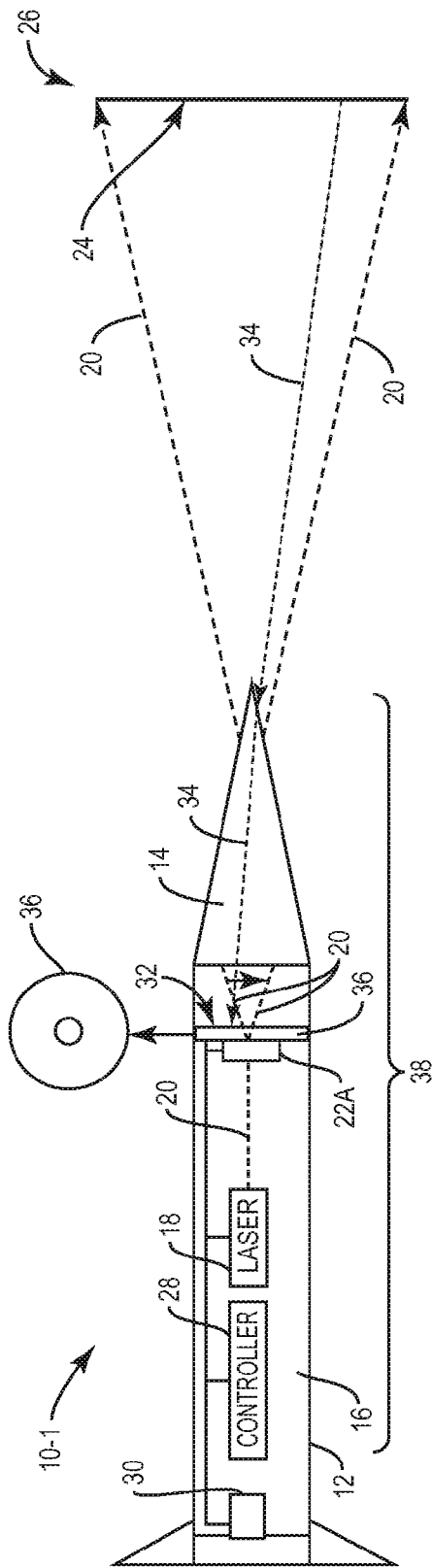
FIG. 4 is a block diagram of a system according to another embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The term "about" used herein in conjunction with a numeric value means any value that is within a range of ten percent greater than or ten percent less than the numeric value.

The embodiments relate to a solid optically transparent nose cone and related components that facilitate the emission of energy, such as laser energy, from inside a body of a missile through the nose cone, and the receipt of reflected laser energy through the nose cone. The reflected laser energy may be used, for example, to guide the missile.

FIG. 1 is a block diagram of a system 10 in which embodiments may be practiced. The system 10 includes a missile 12 that includes a nose cone 14 and a body 16. The nose cone 14 is an aerodynamic and conformal nose cone, and has a shape that is more elongated than it is wide. Thus, a length of the nose cone 14 is greater than a diameter of the nose cone 14. The nose cone 14 is solid, and may comprise any suitable optically transparent material, including, by way of non-limiting example, polycarbonate, glass, acrylic, or sapphire.

The body 16 houses a number of components, including a laser 18 that is configured to emit energy, in the form of a laser beam 20. In some embodiments, the laser 18 comprises a high pulse-repetition-frequency laser. The laser beam 20 is controlled by a scanning mechanism, such as a translation scanning mechanism 22, and transmitted through the nose cone 14 to form a scan pattern 24 in a far field 26 of the laser beam 20 within a field of regard. The translation scanning mechanism 22 may comprise any suitable beam translator. In one embodiment, the translation scanning mechanism 22 comprises an Agilent N1203C Precision beam translator, manufactured by Agilent Technologies, 5301 Stevens Creek Blvd, Santa Clara, Calif. 95051.

The body 16 also houses a controller 28 and a missile guidance system 30. In one embodiment, the translation scanning mechanism 22 translates the laser beam 20 in a vertical direction and a horizontal direction with respect to a back surface 32 of the nose cone 14 to cause the laser beam 20 to form the scan pattern 24 in the far field 26. A scan frequency of the scan pattern 24 may comprise any desired frequency, and in some embodiments, is a frequency between about 1 hertz (Hz) and about 300 Hz. The scan pattern 24 may comprise any desired pattern, including, for example, a scan pattern 24-A and a scan pattern 24-B. The scan angle, frequency and density of the scan pattern 24 may be tailored for a particular mission.

Suitable scanning mechanisms include, by way of non-limiting example, an on-axis, beam translator (e.g. a rotating parallel plate), an integrated in-line beam steering mechanism, such as in-line beam steerers available from Special Optics, Inc., 315 Richard Mine Road, Wharton, N.J. 07885, a Risley prism pair, or a two-axis scanner (angle and translation at the back surface 32 of the nose cone 14).

In operation, the controller 28 is configured to cause the translation scanning mechanism 22 to scan the laser beam 20 such that a desired scan pattern 24 is formed in the far field 26. An object in the far field 26 may cause a reflection of the laser beam 20. Reflected laser energy in the form of a reflection 34 of the laser beam 20 strikes the nose cone 14 and is transmitted through the nose cone 14 to a detector 36. The detector 36 may comprise, for example, an annular detector comprising a single detector element. Alternatively, in some embodiments, the detector 36 may comprise a quadrant detector 36 which includes four detector elements. Based on the received reflection 34, the controller 28 may send a signal to the missile guidance system 30 to alter a direction of the missile 12. In some embodiments, an optical relay adapter may be utilized to deliver the reflected laser beam to the detector 36. The nose cone 14, the detector 36, the translation scanning mechanism 22, the laser 18, and the controller 28 may be collectively referred to as a front-end assembly 38.

In one embodiment, the controller 28 determines a location from which the reflection 34 originated based on the particular scan pattern 24. In particular, the reflection 34 may be received by the detector 36 at a first time. The controller 28 may determine a location in the far field 26 at which the laser beam 20 was directed at the first time based on the scan pattern 24.

FIG. 2 is a diagram illustrating an example scan pattern 24-A. Based on the geometry of the nose cone 14 and the index of refraction of the material of which the nose cone 14 is made, the controller 28 operates the translation scanning mechanism 22 to generate the scan pattern 24-A in the far field 26.

FIG. 3 is a diagram illustrating an example scan pattern 24-B. Again, based on the geometry of the nose cone 14 and the index of refraction of the material of which the nose cone 14 is made, the controller 28 operates a scanning mechanism, such as the translation scanning mechanism 22, to generate the scan pattern 24-B in the far field 26. Any suitable scan pattern 24 may be formed, at any desired frequency. In some embodiments, a memory (not illustrated) may include a plurality of different scan pattern instruction sets, each scan pattern instruction set corresponding to a different scan pattern 24. The controller 28 may be programmed to select a particular scan pattern instruction set, based, for example, on a particular mission, expected target, environmental conditions, or any other criteria.

FIG. 4 is a block diagram of a system 10-1 according to another embodiment. The system 10-1 is substantially similar to the system 10 discussed above with regard to Figure, except as otherwise discussed herein. In this embodiment, a scanning mechanism such as a tilt scanning mechanism 22-A is utilized to cause the laser beam 20 to form the scan pattern 24 in the far field 26. The tilt scanning mechanism 22-A causes the laser beam 20 to strike the back surface 32 of the nose cone 14 at various angles in order to form the scan pattern 24 in the far field 26. Suitable tilt scanning mechanisms 22-A may include, for example, an electro-mechanical actuated tilting mirror, an acoustic-optic modulator, or the like.

Figure 5:
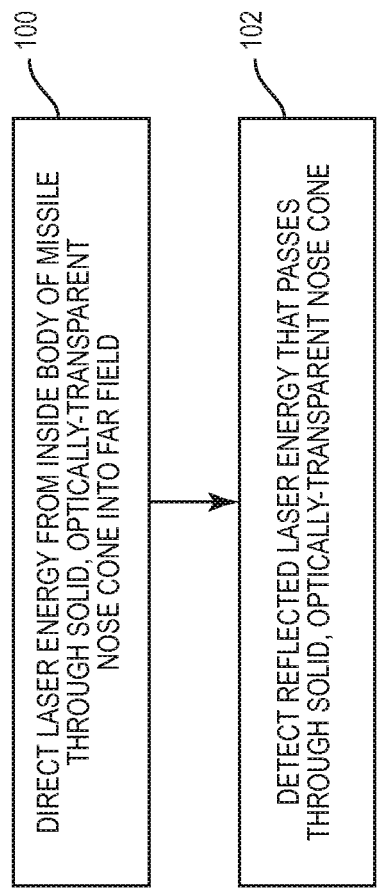
FIG. 5 is a flowchart of a method according to one embodiment.

FIG. 5 is flowchart of a method, according to one embodiment. FIG. 5 will be discussed in conjunction with FIG. 1. The laser 18 directs energy from inside the body 16 of the missile 12 through the solid optically transparent nose cone 14 into the far field 26 (FIG. 3, block 100). The detector 36 detects the reflection 34 that passes through the solid optically transparent nose cone 14 (FIG. 3, block 102).

Figure 6:
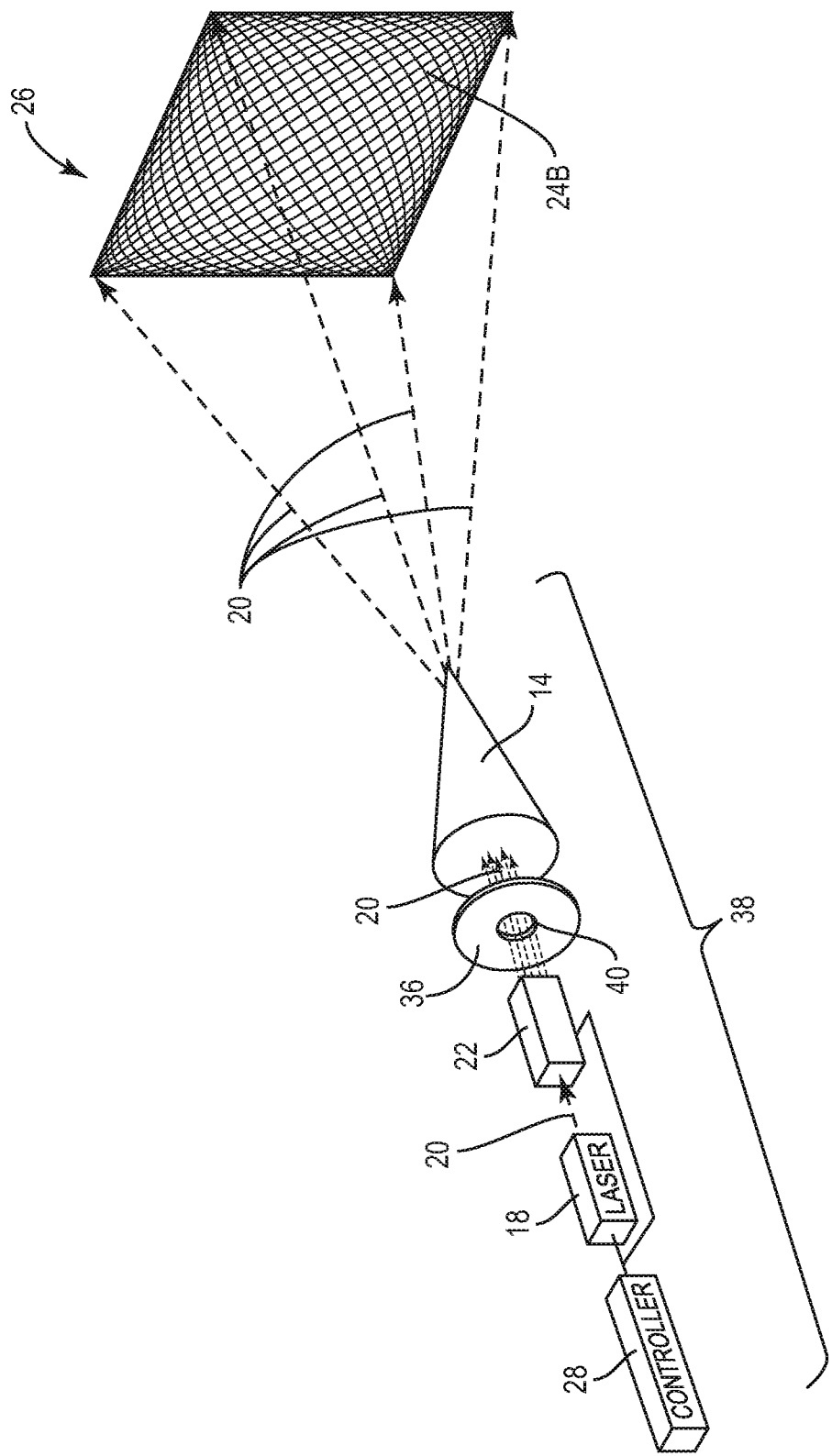
FIG. 6 is a partially exploded diagram illustrating a front end assembly generating a scan pattern according to one embodiment.

FIG. 6 is a partially exploded diagram illustrating the front end assembly 38 generating the scan pattern 24-B according to one embodiment. In this embodiment, the controller 28 operates the laser 18 and the translation scanning mechanism 22 to generate the scan pattern 24-B in the far field 26. Note that the detector 36 is in the path of the laser beam 20 and includes a transparent opening 40 through which the laser beam 20 is transmitted. The transparent opening 40 may comprise a lack of any material, or may comprise a material that is transparent to the laser beam 20.

Figure 7:
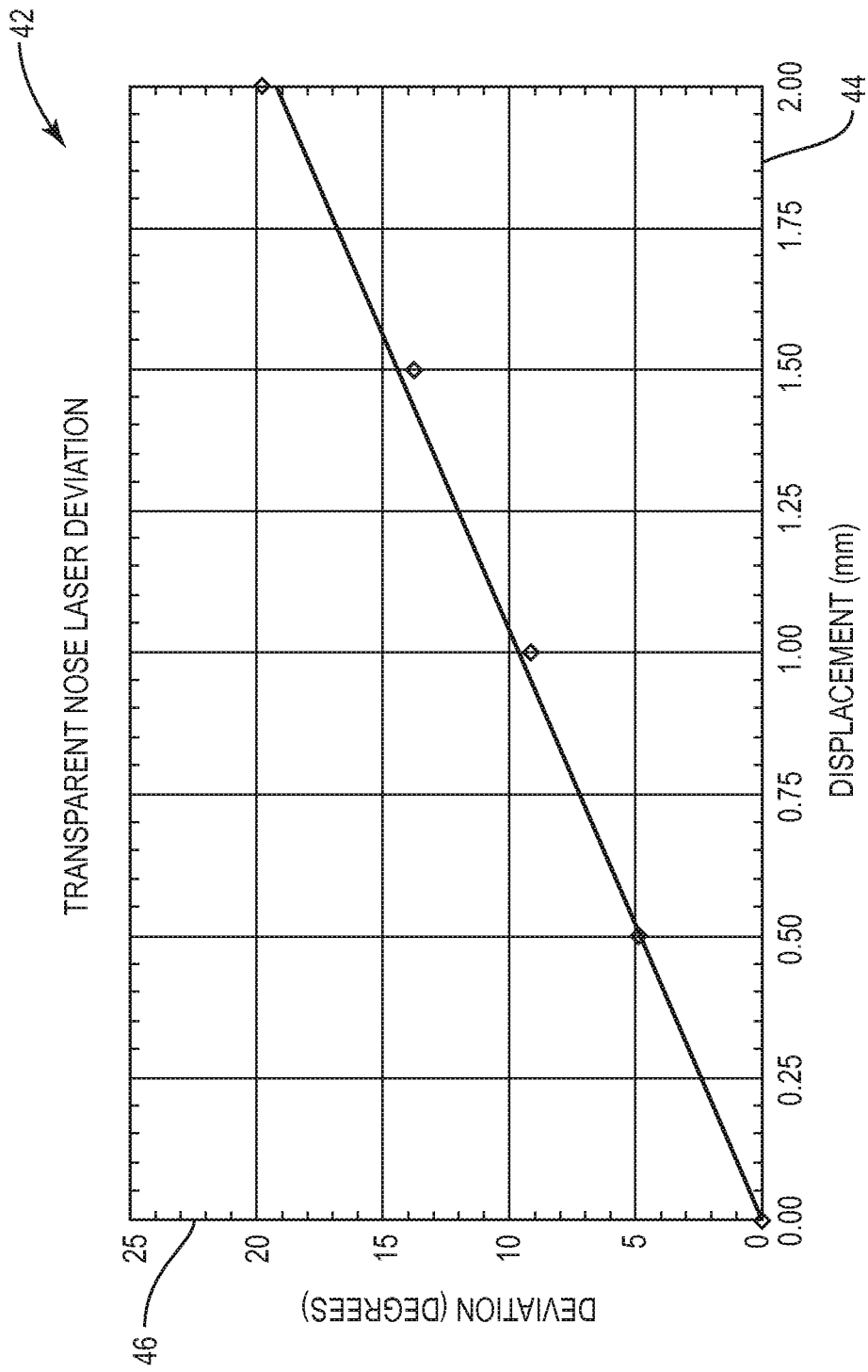
FIG. 7 is a graph that illustrates angular deviation of a laser beam as the laser beam is transmitted through a solid optically transparent nose cone while being translated against a back surface of the nose cone, according to one embodiment.

FIG. 7 is a graph 42 that illustrates angular deviation of a laser beam as the laser beam is transmitted through an example solid optically transparent nose cone 14 while the laser beam is being translated against a back surface of the nose cone 14, according to one embodiment. The slope of the line shown on the graph 42 illustrates an approximate linear conversion of displacement of the input laser beam to the output exit angle. An X-axis 44 identifies an amount of translation of the laser beam with respect to a center of a back (trailing) surface of the nose cone 14. A Y-axis 46 identifies a deviation of the laser beam as the laser beam is emitted from the front of the nose cone 14. For example, translating the laser beam 0.50 mm from the center of the back surface of the nose cone 14 resulted in an angular deviation of 5 degrees at the front of the nose cone 14. The particular angular deviation would differ for different nose cones 14, based at least in part on the particular shape of the nose cone 14 and the index of refraction of the material from which the nose cone 14 is made. As another example, translating the laser beam 1.50 mm from the center of the back surface of the nose cone 14 resulted in an angular deviation of approximately 14 degrees at the front of the nose cone 14.

Figure 8:
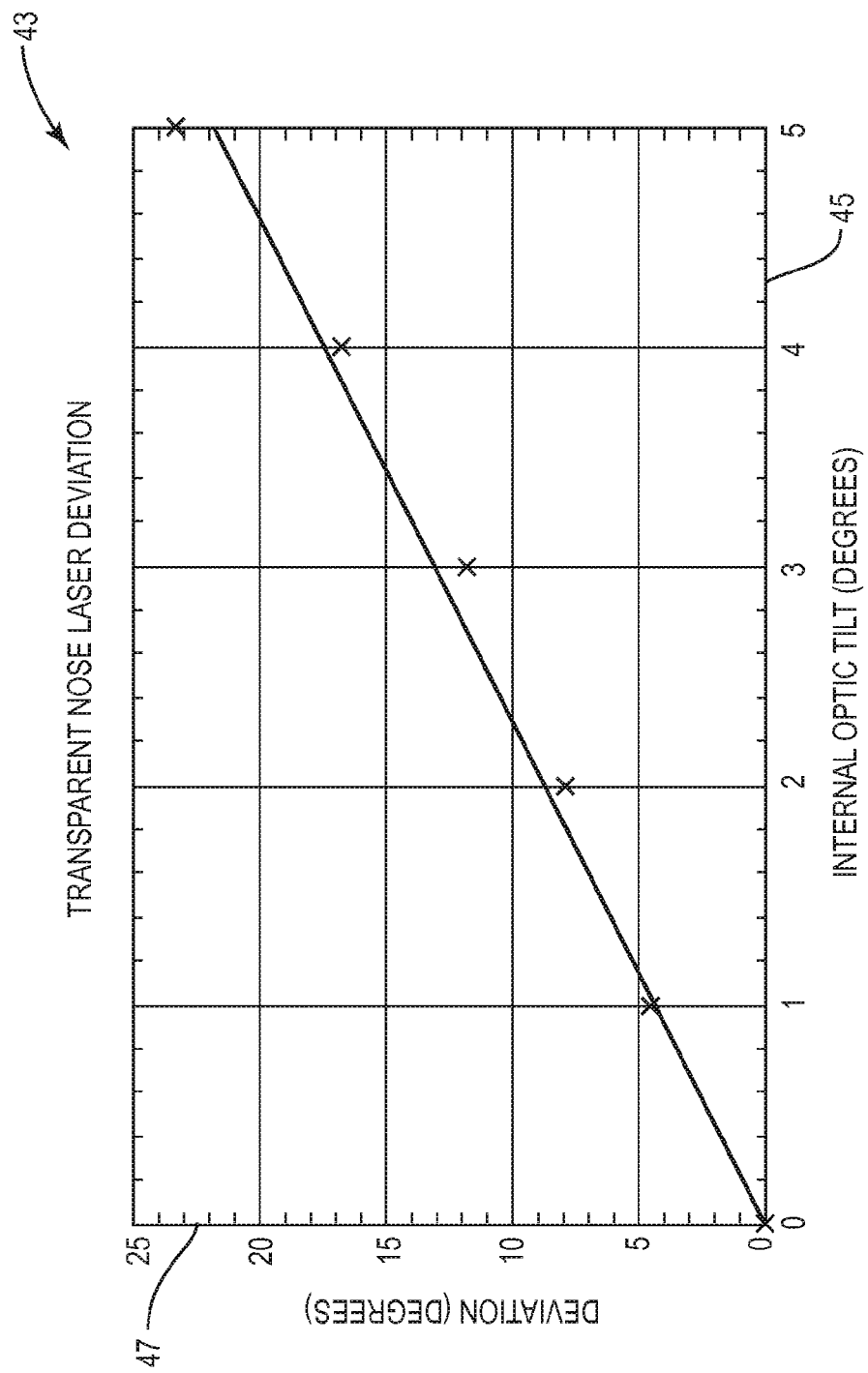
FIG. 8 is a graph that illustrates angular deviation of a laser beam as the laser beam is transmitted through a solid optically transparent nose cone while being tilted against a back surface of the nose cone, according to one embodiment.

FIG. 8 is a graph 43 that illustrates angular deviation of a laser beam as the laser beam is transmitted through a solid optically transparent nose cone 14 while being tilted against a back surface of the nose cone 14, according to one embodiment. The slope of the line shown on the graph 43 illustrates an approximate linear conversion of tilt of the input laser beam to the output exit angle. An X-axis 45 identifies an amount of tilt of the laser beam with respect to a center of a back (trailing) surface of the nose cone 14. A Y-axis 47 identifies a deviation of the laser beam as the laser beam is emitted from the front of the nose cone 14. For example, tilting the laser beam 1 degree from perpendicular against the back surface of the nose cone 14 resulted in an angular deviation of 5 degrees at the front of the nose cone 14. The particular angular deviation would differ for different nose cones 14, based at least in part on the particular shape of the nose cone 14 and the index of refraction of the material from which the nose cone 14 is made. As another example, tilting the laser beam 3 degrees from perpendicular against the back surface of the nose cone 14 resulted in an angular deviation of approximately 12 degrees at the front of the nose cone 14.

Figure 9:
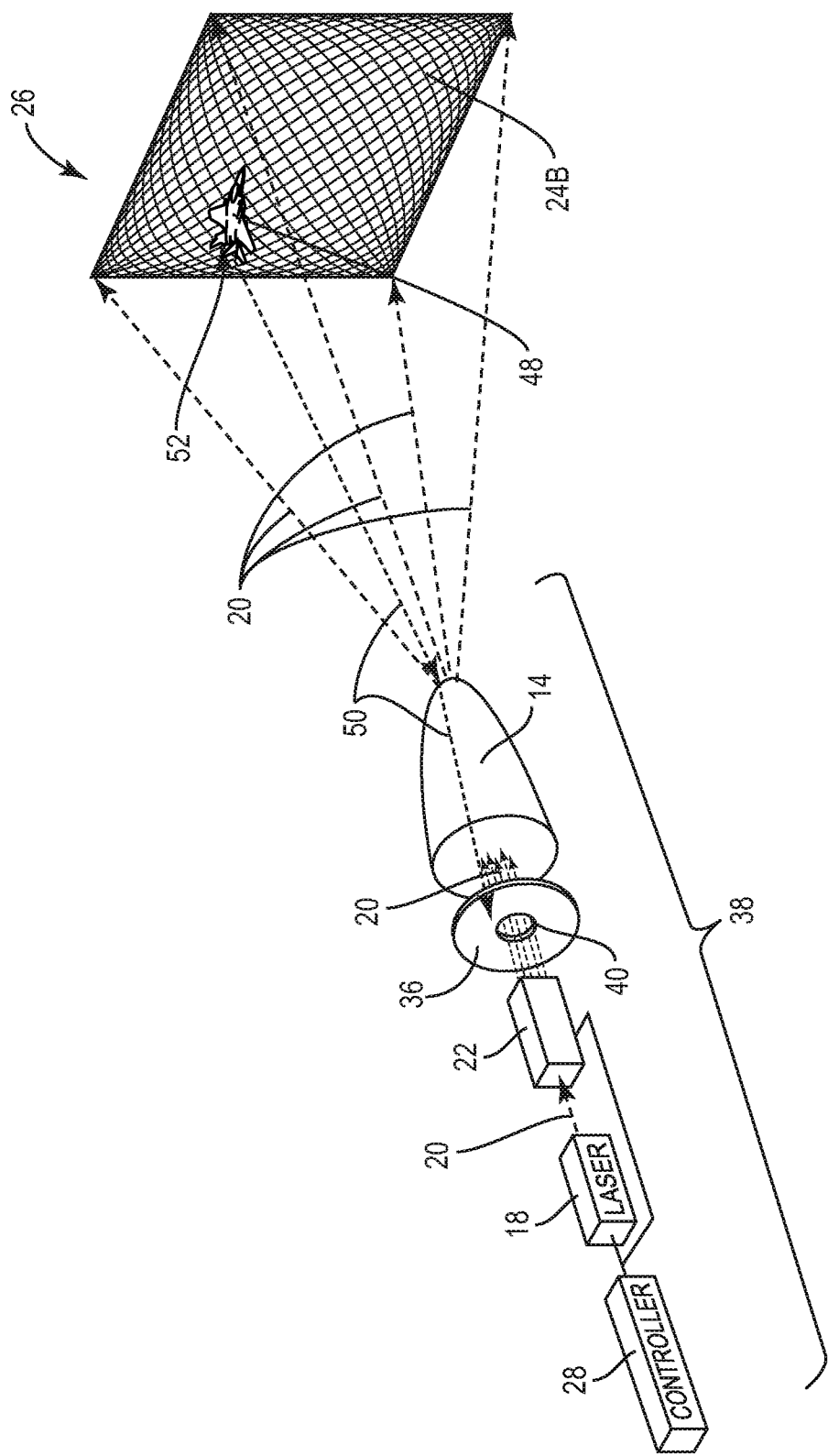
FIG. 9 is a block diagram of a system in operation, according to one embodiment.

FIG. 9 is a block diagram of the system 10 in operation, according to one embodiment. Assume, for purposes of illustration, that the missile 12 is in flight. The front-end assembly 38 generates the scan pattern 24-B in the far field 26 at a frequency of 30 hertz. An object 48 reflects the laser beam 20, generating a reflection 50 back toward the nose cone 14. The detector 36 detects the reflection 50. The controller 28 determines that the laser beam 20 was oriented at a location 52 of the scan pattern 24-B at the time the reflection 50 was detected by the detector 36, and thus determines the location 52 as the location of the object 48. The controller 28 may signal the missile guidance system 30 to alter the direction of the missile 12 such that the missile 12 is directed toward the location 52, or some suitable intercept location.

In one embodiment, the laser 18 comprises a high pulse-repetition-frequency laser, and laser pulses detected by the detector 36 can be used to generate a one-dimensional (1D) high range-resolution (HRR) profile. The 1D HRR profile may be used, for example, for target identification and aim point refinement, and can extract a target out of clutter, thereby minimizing the impact of any potential countermeasures.

Figure 10:
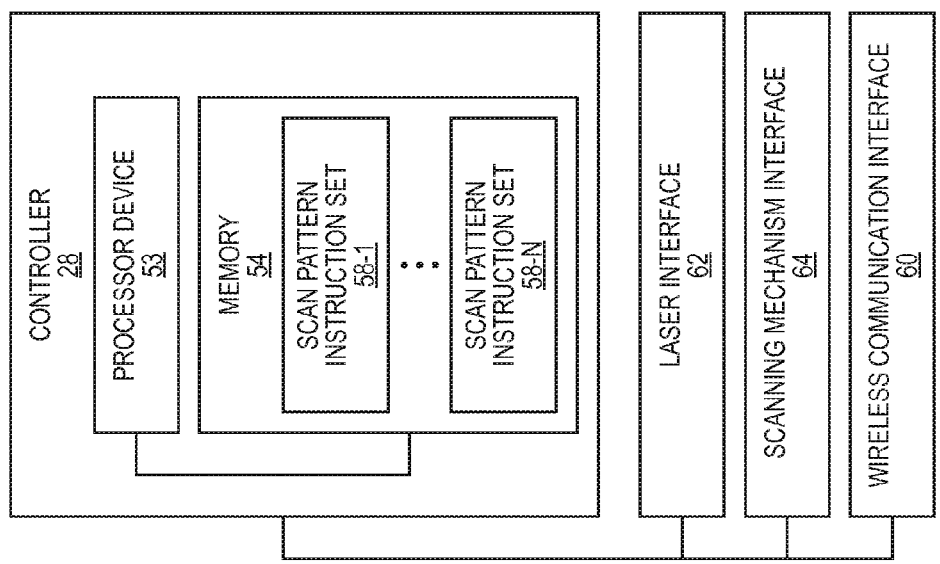
FIG. 10 is a block diagram of a controller according to one embodiment.

FIG. 10 is block diagram of a controller 28 according to one embodiment. In one embodiment the controller 28 includes a processor device 53 and a memory 54. The processor device 53 may comprise any suitable commercially available or proprietary processor or combination of processors. The memory 54 may include, among other things, one or more scan pattern instruction sets 58-1-58-N (generally, scan pattern instruction sets 58). Each scan pattern instruction set 58 may provide an appropriate instruction set for generating a particular scan pattern 24. In one embodiment, the controller 28 may receive an input that identifies a particular scan pattern instruction set 58, and based on the input, access the identified scan pattern instruction set 58 to generate the corresponding scan pattern 24. In one embodiment, the input may be provided by an operator, and received by the controller 28 via a wireless communication interface 60. The controller 28 may also be coupled to, or include, a laser interface 62 configured to drive the laser 18, and a scanning mechanism interface 64 configured to drive the particular scanning mechanism in accordance with a particular scan pattern instruction set 58.

In some embodiments, a compensating optical element may be used at the output of the laser 18. This compensating optical element may be used to compensate for any additional divergence and/or distortion imparted to the transmitted laser beam 20 by the conformal nose cone 14. The optical design of such compensating optical element may vary based on the conformal nose cone 14 prescription and material index of refraction in order to provide suitable compensation.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    directing, from within a body of a missile, laser energy through a solid, optically transparent nose cone into a field of regard; and
    detecting, by a detector in the body, reflected laser energy that passes through the solid, optically transparent nose cone.

2. The method of claim 1, further comprising:
    based on detecting the reflected laser energy, sending a signal to a missile guidance system of the missile to alter a direction of the missile.

3. The method of claim 1, wherein the detector comprises an annular detector comprising a single detector element.

4. The method of claim 1, wherein the laser energy comprises a laser beam, and wherein directing the laser energy from inside the body of the missile through the solid, optically transparent nose cone further comprises:
    directing the laser beam from inside the body of the missile through the solid, optically transparent nose cone to cause the laser beam to generate a scan pattern in a far field of the laser beam.

5. The method of claim 4, wherein directing the laser beam from inside the body of the missile through the solid, optically transparent nose cone to cause the laser beam to generate the scan pattern in the far field of the laser beam comprises:
    emitting the laser beam while concurrently translating the laser beam behind the solid, optically transparent nose cone in a translation pattern that causes emission of the laser beam from a front of the solid, optically transparent nose cone to generate the scan pattern in the far field of the laser beam.

6. The method of claim 4, wherein directing the laser beam from inside the body of the missile through the solid, optically transparent nose cone to cause the laser beam to generate the scan pattern in the far field of the laser beam comprises:
    emitting the laser beam while concurrently tilting the laser beam in a tilt pattern that causes emission of the laser beam from a front of the solid, optically transparent nose cone to generate the scan pattern in the far field of the laser beam.

7. The method of claim 4, wherein the reflected energy is a reflected laser beam, and the reflected laser beam is detected at a first time, and further comprising determining a location in the far field of the laser beam at which the laser beam was directed at the first time based on the scan pattern.

8. The method of claim 7, further comprising:
    based on the location, sending a signal to a missile guidance system of the missile to direct the missile toward the location.

9. The method of claim 4, wherein one of an on-axis beam translator, an integrated in-line beam steering mechanism, a Risley prism pair, and a two-axis scanner configured to cause angle and translation at a back surface of the solid, optically transparent nose cone is utilized to cause the laser beam to generate the scan pattern in the far field of the laser beam.

10. The method of claim 1, wherein directing laser energy through the solid, optically transparent nose cone comprises directing the laser energy incident to a trailing end surface of a trailing end of the solid, optically transparent nose cone, and
    wherein the laser energy that passes through the solid, optically transparent nose cone comprises laser energy that passes into the body of the missile via the trailing end surface of the solid, optically transparent nose cone.

11. A missile comprising:
    a solid, optically transparent nose cone;
    a scanning mechanism configured to scan a laser beam through the solid, optically transparent nose cone and form a scan pattern in a far field of the laser beam; and
    a detector configured to detect a reflected laser beam that passes through the solid, optically transparent nose cone.

12. The missile of claim 11, further comprising:
    a missile guidance system; and
    a controller configured to signal the missile guidance system to alter a direction of the missile based on the reflected laser beam.

13. The missile of claim 12, wherein the controller is further configured to:
    determine a time of a detection of the reflected laser beam;
    determine a location where the laser beam was directed at the time; and
    signal the missile guidance system to alter the direction of the missile toward the location.

14. The missile of claim 13, wherein the controller is configured to cause the scanning mechanism to scan the laser beam in the scan pattern; and wherein to determine the location, the controller is configured to determine the location based on the scan pattern.

15. The missile of claim 13, wherein the laser beam is a pulsed laser beam, and further comprising a controller configured to generate a one-dimensional high range-resolution profile based on detection of reflected laser beam pulses.

16. The missile of claim 11, wherein:
    the detector is annular, and forms a transparent opening in a center of the detector, the detector being positioned in a path of the laser beam between the scanning mechanism and the solid, optically transparent nose cone; and
    the scanning mechanism is configured to scan the laser beam through the transparent opening.

17. The missile of claim 11, wherein the scanning mechanism comprises one of an on-axis beam translator, an integrated in-line beam steering mechanism, a Risley prism pair, and a two-axis scanner configured to cause angle and translation at a back surface of the solid, optically transparent nose cone.

18. A missile front-end assembly comprising:
    a solid, optically transparent nose cone;
    a controller;
    a scanning mechanism coupled to the controller, and configured to scan, in response to signals from the controller, a laser beam through the solid, optically transparent nose cone to form a scan pattern in a far field of the laser beam; and
    a detector configured to detect a reflected laser beam that passes through the solid, optically transparent nose cone.

19. The missile front-end assembly of claim 18, wherein the detector is annular, and forms a transparent opening in a center of the detector, the detector being positioned in a path of the laser beam between the scanning mechanism and the solid, optically transparent nose cone; and the scanning mechanism is configured to scan the laser beam through the transparent opening.

20. The missile front-end assembly of claim 18, wherein the controller is further configured to signal a missile guidance system to alter a direction of the missile based on the reflected laser beam.

21. The missile front-end assembly of claim 20, wherein the controller is further configured to:

determine a time of a detection of the reflected laser beam;

determine a location where the laser beam was directed at the time; and signal the missile guidance system to alter the direction of the missile toward the location.

* * * * *